T 860,007

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MARCH 18, 1969

860 O.G. 678

644,485

SAFETY INKS

Albert P. Romano, Pitman, N.J., assignor to E. I. du Pont de Nemours and Company, Wilmington, Del., a corporation of Delaware

Filed June 8, 1967. Published Mar. 18, 1969

Class 106—22

No Drawing. 10 Pages Specification

A safety ink, which leaves a stain when treated with ink eradicator, comprising an organic dye, a dye solvent and 0.5 to 10% by weight an amino-aryl thiazole of the general formula:

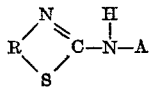

wherein R is a divalent carbocyclic aryl group of from 6 to 10 carbon atoms which may be substituted by members selected from —H, —Cl, —Br, —$NO_2$, —COOH, —COOM, —OY, —Y, —$SO_2NH_2$ and —$SO_3H$, where M is an alkali metal and Y is selected from methyl and ethyl groups; the R group has adjacent carbon atoms which are attached to the nitrogen and sulfur atoms respectively; and A is selected from hydrogen, alkyl and aryl groups.